Nov. 8, 1955   D. A. VAN SCOY   2,722,855
TAPPING APPARATUS
Filed Feb. 9, 1953

Davis A. VanScoy
INVENTOR.
BY Browning & Simms

United States Patent Office 2,722,855
Patented Nov. 8, 1955

2,722,855

TAPPING APPARATUS

Davis A. Van Scoy, Tulsa, Okla., assignor to T. D. Williamson, Inc., Tulsa, Okla., a corporation of Oklahoma Application February 9, 1953, Serial No. 335,697

7 Claims. (Cl. 77—37)

This invention relates to an apparatus for tapping a hole or opening in a pressure vessel, such as a pipe or the like, particularly while the vessel is filled with fluid under pressure without any substantial leakage of such fluid.

The cutting of an opening through the wall of a pressure vessel or pipe while the same contains a fluid under pressure is commonly termed "hot tapping." Such tapping is usually performed in those instances where it is desired to connect a flow line to the pressure vessel or pipe without taking the latter out of operation and removing pressure fluid therefrom. For example, hot taps are often resorted to in connecting into a pipeline carrying petroleum fluids so as to not be forced to shut down the pipeline, drain and steam the same and then place it back in operation after the connection has been made as would be the case if an ordinary connection were made by welding a T in the pipeline or by cutting a hole in the pipeline and welding a pipe stub around the hole. Hot taps, on the other hand, are made by first welding a stub pipe to the vessel or pipe to which the tap is to be made and then mounting a valve on the stub. The tapping apparatus is next mounted on the valve and its cutter run through the open valve to cut the opening in the vessel or pipe. After the opening has been cut, the cutter is retracted and the valve closed after which the tapping apparatus can be removed without any substantial leakage of fluid from the vessel.

While tapping apparatus or machines for performing this function are available upon the open market today, such machines are relatively complicated due to the fact that they are intended primarily for cutting a large opening in the wall of a vessel and, therefore, must provide a correspondingly large power input to the cutter. The apparatus for applying such power input is necessarily quite complicated and not at all necessary in a tapping apparatus for cutting small openings, such as 2 inches in diameter or less, where the power requirements are relatively small. The greater degree of complexity of the larger tapping machines inevitably results in their being of substantial weight so that their use is proportionally difficult. It is, therefore, an object of this invention to provide a tapping machine particularly adapted to be made for cutting openings of relatively small size and which is simple and easy to construct and operate and, further, which is lightweight and yet able to withstand high fluid pressures encountered in making a hot tap.

Another object of this invention is to provide an apparatus or tool for tapping an opening in the wall of a pressure vessel or the like wherein a cutter is concomitantly revolved and moved longitudinally toward or away from a work piece by turning a single driving means.

Another object of this invention is to provide such an apparatus having two rates of cutter feed, the mechanism providing such different rates being actuated by a single arm which also rotates the cutter.

Another object of this invention is to provide a tapping apparatus in which power to the cutter is directly transmitted thereto by a boring bar having the cutter on one end and a crank arm on the other so that the required power can be applied to the cutter with a minimum of motion by an operator of the apparatus since one revolution of the cutter results from a single revolution of the crank arm.

Another object of this invention is to provide a tapping apparatus in which a boring bar having a cutter at one end is slidingly and rotatably sealed to a frame in such a manner that the sealing means is expanded during the cutting operation to increase its effectiveness as a seal and, upon the tap being made and pressure fluid flowing into contact with the seal means, the latter is expanded by the pressure of said fluid.

Another object of this invention is to provide such a tapping apparatus in which the cutter feed is provided by orbital gears revolved about gears on the frame and cutter feed screw by means of the crank arm turning the cutter, such gear system being adapted to be rendered ineffective to perform the function of feeding the cutter at a relatively low rate while at the same time connecting the feed screw and crank arm so that each revolves at the same speed, thereby providing a high speed feed and retraction for the cutter.

Another object of this invention is to provide a tapping apparatus which is relatively simple in construction and operation so as to be susceptible to only a minimum of abuse or improper operation by inexperienced personnel.

Another object of this invention is to provide a tapping apparatus of the above type which can be employed to hot tap vessels under elevated pressures without any substantial leakage of fluids from such vessels and yet which is lightweight and simple in construction.

Other objects, advantages and features of this invention will be apparent to one skilled in the art upon consideration of the written specification, the appended claims and the attached drawing wherein:

Like characters of reference are used throughout the several views to designate like parts.

Figure 1:
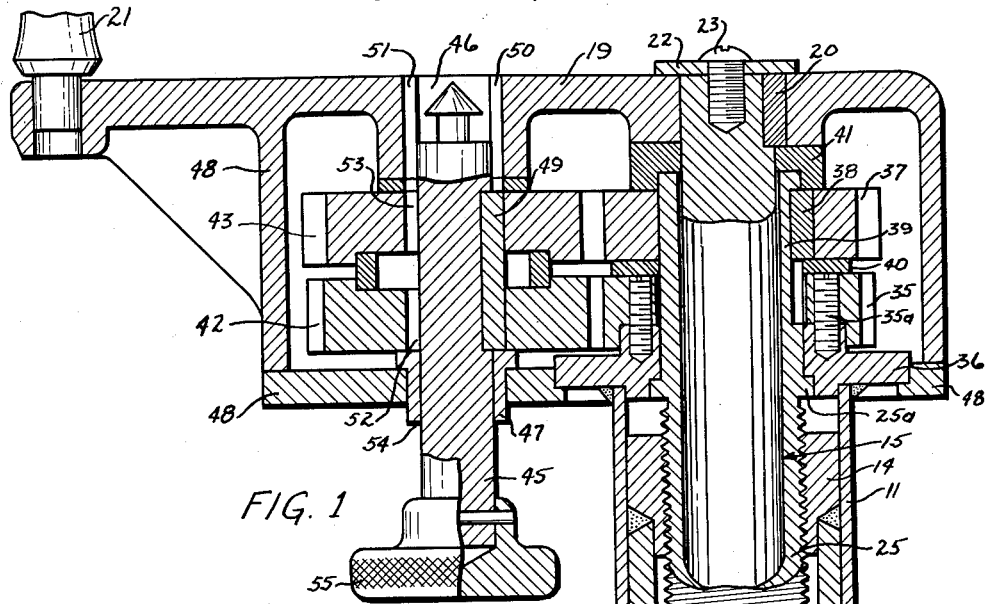
Fig. 1 is an elevational cross-sectional view of a preferred embodiment of this invention with the parts of the apparatus positioned to longitudinally move the boring bar and cutter at a low rate of speed.

Referring now to the drawings, there is provided a frame made up of parts 10 and 11. Part 10 has a threaded bushing 12 attached thereto, as by welding, to provide a connector for fixedly mounting the frame to the vessel or pipe to be tapped. For example, threaded bushing 12 can be screwed into a collar 13 (shown in dashed outline), or into the threaded end of a valve attached to a stub on the vessel to be tapped. Where a flange connection is desired, bushing 12 can be connected to one flange which is to be bolted to a flange on the valve or stub connected to the vessel. In any event, bushing 12 provides a means for connecting the tapping apparatus with a fluid tight connection to the stub or valve through which the tap is to be made.

Part 11 of the frame is movable longitudinally or axially with respect to part 10 and a connection is provided between such parts permitting such longitudinal movement but preventing relative rotation between the parts. For this purpose, there is provided a nut 14 having an outer wall of non-circular cross-sectional configuration, such as square, and adapted to slide within part 11 which has an inner wall of similar configuration. Part 11 is formed as a tubular structure telescoping over part 10 and preferably part 11 is square in cross-section to slidably mate with square nut 14. In this manner, there is provided a frame which is longitudinally extensible with the parts thereof non-rotatably mountable on the vessel to be tapped.

Figure 3:

Extending through the frame is a boring bar, designated generally by the numeral 15, adapted to be rotated with respect to the frame and to carry a cutter, such as the one shown at 16 in Fig. 3, at its end adjacent the wall of the vessel or pipe to be tapped. As shown in Figs. 1 and 3, cutter 16 has a wrench portion 17 adapted to fit into a corresponding wrench opening 18 at one end of the boring bar so that upon rotation a firm force transmitting connection is provided between the cutter and boring bar. To hold the cutter to the boring bar, there is provided a threaded nut 18a removable from the boring bar and then slidable over shank 16a of the cutter to be threaded onto the boring bar to bear against collar 16b after portion 17 has been inserted into opening 18.

Means are provided for rotating the boring bar comprising a radial arm 19 connected to one end of the boring bar, as by key 20, and having a handle 21 at its radially outer end so that power can be applied to arm 19 to rotate the boring bar. Key 20 and arm 19 can be held in place on the end of the boring bar by washer 22 extending over both the key and the arm and connected to the boring bar by means of a bolt 23. With this construction, it will be apparent that upon the application of force to handle 21, such force will be transmitted through arm 19 and the boring bar to the cutter. It should be noted that this provides a direct drive connection between the boring bar and the source of power which in most cases will be manual.

Means are provided which are responsive to the boring bar rotating means 19 for advancing and retracting the boring bar toward and away from the vessel to be tapped; in other words, to move the boring bar longitudinally with respect to frame part 10. Such means comprises an elongate feed screw 25 which is externally threaded throughout a substantial portion of its length to provide a threaded connection with nut 14. With this construction, turning of screw 25 will cause the same to be moved longitudinally with respect to frame part 10 since the feed screw is in effect threaded to such part.

In order to employ the longitudinal movement of feed screw 25 to move boring bar 15, a connection is provided therebetween which permits rotation of the boring bar with respect to the screw but substantially limits longitudinal movement therebetween. Such connection can comprise an end bearing 26 in abutment with a shoulder 27 on the feed screw and longitudinally slidable along frame part 10. It will be noted that bearing 26 has a face 28 in abutment with the circumferential face of shoulder 27 thereby holding the lower end of the feed screw in proper alignment with the frame and preventing sidewise movement of the same. As a part of the connection between the feed screw and boring bar, packing 29 is provided and is held in place by a removable part of the boring bar in the form of a gland nut 30 having a threaded connection with the lower end of boring bar portion 15a. Packing 29 is in sealing engagement with the lower end of boring bar portion 15a and also with the interior wall of frame part 10 but permits relative rotation between the boring bar and frame. The inside surface of frame part 10 is preferably polished so that packing 29 can slide longitudinally over such surface. Gland nut 30 is adjustable to afford a predetermined initial compression of packing 29 and such adjustment can be had merely by turning the nut on its threaded connection to boring bar portion 15a. When such adjustment has been made, the gland nut is desirably held in adjusted position as by a locking pin 31 extending across the threaded opening of the gland nut in register with a slot 32 in the lower end of boring bar portion 15a. A plurality of openings 33 can be provided into any one of which the locking pin 31 can be screwed, thereby providing suitably fine adjustment for compressing the packing. It will be noted that packing 29 is illustrated as being of the chevron type and disposed so that fluid pressure from the tapped vessel or pipe expands it into even tighter sealing engagement with the boring bar and frame.

With the above construction, it will be apparent that upon turning of screw 25 in a direction to feed the boring bar toward the vessel to be tapped, the screw will advance downwardly with the apparatus positioned as in Fig. 1 and likewise urge boring bar 15 downwardly. While this is happening, boring bar 15 can be turning relative to both the screw and frame so that it can operate at a different rotation speed than the screw. It will further be apparent that by turning screw 25 at a proper rotational rate, the cutter attached to the end of boring bar 15 will be fed at a predetermined rate while the same is being simultaneously rotated by force transmitted through bar 15. Still further, the force moving the boring bar downwardly is transmitted through packing 29 from screw 25 and, accordingly, the packing is particularly expanded into an even tighter sealing engagement with the boring bar and frame during the actual cutting operation due to the force of the feed screw urging the cutter into cutting contact with the vessel or pipe being tapped. This urging force is greatest during the actual cutting operation and hence packing 29 will be expanded to its greatest extent at such time. Accordingly, upon the cutter breaking through the pipe or vessel wall so that fluid therefrom can flow into contact with the packing, a very tight seal is provided at such instant to effectively prevent escape of fluid. Thereafter, the fluid pressure itself will urge the packing into a sufficiently tight seal to prevent substantial leakage of the fluid.

In order to turn the feed screw at a predetermined rate simultaneously with rotation of the boring bar, means are provided responsive to the bar rotating means for turning the screw upon rotation of the bar, such means including a clutch so arranged that, when in one position, the screw will be turned at a rotational rate substantially less than that of the bar and, when in a second position, at a rate equal to that of the bar. Thus, there is provided a gear 35 non-rotatably connected to frame part 11 as by bolts 35a clamping the gear to a radial bushing 36, the latter being connected, as by welding, to frame part 11. A driven gear 37 is attached, as by key 38, to an extended portion 39 of feed screw 25 so that, upon turning of gear 37, the feed screw will likewise be rotated. Inasmuch as gears 37 and 35 are rotatable with respect to each other, an intermediate spacer bearing 40 is provided therebetween. Also, a main bearing 41 is situated between gear 37 and arm 19 to permit ready rotation of gear 37 and screw 25 with respect to the arm. With this construction, gear 35 remains in a fixed position relative to the frame of the tapping apparatus whereas gear 37 is rotatable with respect thereto. Gear means are provided for interconnecting gears 35 and 37 and such gear means is rotatably carried by arm 19 so that upon rotation of the arm, power is applied to rotate gear 37 with respect to gear 35 and thereby turn feed screw 25 at a rotational rate substantially less than that of arm 19 and bar 15. Such gear means can comprise orbital gears 42 and 43 meshing respectively with gears 35 and 37. It will be noted that in the preferred embodiment of the invention, gears 35 and 37 are mounted coaxially with each other and with screw 25 and bar 15. Gears 42 and 43 are likewise coaxially mounted on arm 19 with their axis of rotation parallel to but radially spaced from that of gears 35 and 37. With this construction, gears 42 and 43 roll around gears 35 and 37 upon rotation of arm 19. By properly sizing the gears and by having a part which interconnects gears 42 and 43 to limit rotation therebetween, gear 37 can be made to turn a fraction of a revolution with respect to the frame for each revolution of gears 42 and 43 about their orbit around gears 35 and 37. For example, with gear 35 having 35 teeth at 12 pitch, gear 42 with 34 teeth at 12 pitch, gear 43 with 45 teeth at 16 pitch, and gear 37 with 47 teeth at 16 pitch, approximately 70 revolutions of gears 42 and 43 around their orbit will be required to turn the feed screw one revolution. With the threaded connection between the feed screw and nut 14 being an 8 pitch thread, this will mean that the boring bar will be advanced approximately 0.0018 inch per revolution of arm 19.

As mentioned above, gears 42 and 43 have a part connecting them together so that such gears rotate together through their orbit about gears 37 and 35. Preferably, such part is included as a clutch means which in one position so connects gears 42 and 43 and, upon shifting to another position, disengages gear 42 from gear 43 and non-rotatably connects the latter to arm 19. Upon so connecting gear 43, it will be apparent that a straight drive is provided between arm 19 and screw 25 so that one revolution of the arm will result in one revolution of the screw. Accordingly, a dual speed transmission is provided between arm 19 and screw 25.

Figure 2:
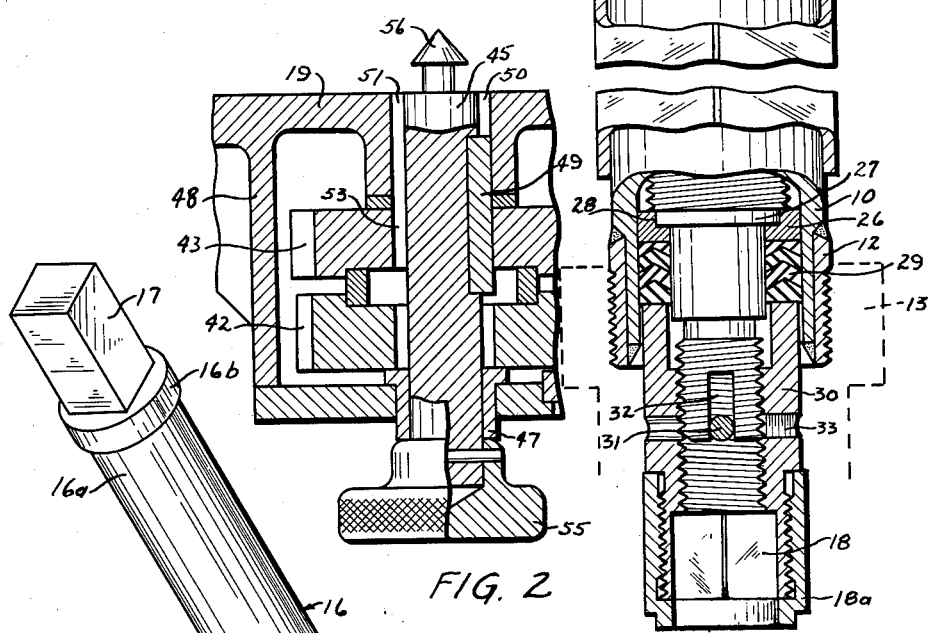
Fig. 2 is a cross-sectional elevation of a portion of the apparatus of Fig. 1 illustrating the parts positioned for a high rate of longitudinal movement of the boring bar and cutter and Fig. 3 illustrates one type of cutter adapted to be employed with the apparatus of Fig. 1.

As shown in Figs. 1 and 2, the clutch means can comprise a shaft 45 journaled for sliding longitudinal movement in arm 19 through opening 46. The other end of the shaft is slidably mounted by bushing 47 to an extension 48 of arm 19, the extension also serving as a housing to enclose the gears and other mechanism as shown. A key 49 is carried by shaft 45 to lie, with shaft 45 in its down position of Fig. 1, within a keyway in gears 42 and 43. A keyway 50 is provided in arm 19 so as to be alignable with the keyways in gears 42 and 43. If desired, additional keyways 51, 52 and 53 can be provided in arm 19, gear 42, and gear 43, respectively, in order that the gears need be rotated only a fraction of a revolution in order to align all three keyways. Upon such alignment of the keyways, shaft 45 can be shifted upwardly to its Fig. 2 position, thereby disengaging key 49 from the keyway in gear 42 and bringing it into register with keyway 50 and arm 19. With the shaft in the Fig. 2 position, gear 42 is free to rotate with respect to gear 43 while the latter is non-rotatably fixed to arm 19 so that it can no longer rotate about gear 37 but is, in effect, directly tied thereto. As a result, rotation of arm 19 causes rotation of screw 25 a like number of revolutions. It will be noted that bushing 47 has a lower shoulder 54 engageable with knob 55 to limit upward travel of shaft 45. Further, the inner end of bushing 47 serves as a stop to limit downward travel of the shaft by being brought into abutment with key 49 as shown in Fig. 1. An indicator 56 can be formed on the upper end of shaft 45 to more easily permit an operator to observe whether the shaft is in slow feed or high feed position.

In operation, the apparatus of this invention can be assembled as above described including the attachment of cutter 16 to boring bar 15. Upon mounting the apparatus in place to make the tap and pulling shaft 45 to its Fig. 2 position, arm 19 can be rotated to advance the cutter rapidly toward the wall of the vessel or pipe to be tapped. In such operation, gear 42 is free to rotate about gear 35 without transmitting any of its motion to the other gears. On the other hand, gear 43 cannot rotate with respect to arm 19 and hence gear 37 cannot rotate with respect to the arm. As a result, a direct drive is established between arm 19 and screw 25 so that the latter is moved longitudinally for each revolution of arm 19 a distance dependent upon the pitch of the threads on screw 25. This particular high feed rate is also desirable when moving cutter 16 out of the tap opening and away from the same after the cutting operation has been completed.

When cutter 16 reaches the wall to be tapped and during the actual cutting operation, shaft 45 is shifted to its Fig. 1 position so that the desired low rate of feed of the cutter can be obtained. With shaft 45 in the Fig. 1 position, gear 42 revolves around its own axis in moving through the orbit around gear 35, since the latter is fixed to the frame. This causes gear 43 to revolve about its axis one revolution for each revolution of gear 42. In turn, gear 37 is turned to a degree dependent upon the difference in effective sizes of the various gears. The gears can be properly sized by mere routine calculation to give a rotation of gear 37 and screw 25 in substantially any desired fractional proportion of the rotation of arm 19. This, along with possible variation in the pitch of the threads on screw 25 and nut 14, permits design of apparatus having a cutter feed selected from a broad possible range thereof. As arm 19 thus rotates and turns screw 25, the same is moved longitudinally of frame part 10 and transmits its motion through packing 29 to the boring bar causing it to move a substantially equal amount. At the same time, the boring bar is being revolved by arm 19 and, accordingly, the cutter is automatically fed into the work piece as it is revolved.

It will be noted that the extension 48 of arm 19, which extension and arm effectively house the gears and upper portions of the boring bar, screw and associated bearings, is connected to bushing 36. This, together with shoulder 25a of screw 25 abutting bushing 36 and the connections between the boring bar and screw and between the boring bar and arm 19, effectively maintains gears 35 and 37 and the boring bar and screw in operative relationship with each other and with gears 42 and 43.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for tapping an opening in a pressure vessel such as a pipe or the like which comprises, in combination, a frame including a first tubular part, a connector on said first tubular part forming a fluid tight connection between the first tubular part and the vessel to be tapped and a second tubular part having a longitudinally slidable but non-rotatable telescoping connection with the first tubular frame part, a tubular screw extending within said first and second tubular parts and threaded to said first tubular frame part for longitudinal movement with respect thereto upon turning of said screw, a boring bar extending through said screw, a crank arm connected to said bar for rotating the latter, a connection between said screw and bar permitting relative rotation but limiting longitudinal movement between the screw and bar and including sealing means forming a seal between the bar and first tubular part to prevent escape of fluid from the vessel to be tapped through said first tubular part, a first gear fixedly carried by said second tubular frame part, a second gear fixedly connected to said screw, said first and second gears being coaxial with said screw, frame parts connecting said crank arm to said first and second gears to restrain said first and second gears against endwise movement with respect to the crank arm and to said bar but permitting relative rotation between the frame parts and first and second gears whereby said first and second gears move longitudinally with the boring bar upon rotation of said screw with respect to said first tubular part, coaxial third and fourth gears meshing respectively with said first and second gears and having an interconnecting part preventing relative rotation of the third and fourth gears, said third and fourth gears being carried by said arm for rotation about an axis parallel to but radially spaced from said screw so that turning of said arm moves said third and fourth gears in a circular orbit about said first and second gears, said gears being sized such that for each revolution of said arm, said screw is rotated a predetermined fraction of a revolution.

2. The apparatus of claim 1 wherein said sealing means between said first tubular frame part and said bar includes a packing, opposed endwise parts respectively held against movement apart by said screw and bar, said packing being disposed between said endwise parts and slidable with respect to said first tubular part so that longitudinal movement of the screw to advance the boring bar tends to move said endwise parts together to compress said packing and expand it against said screw and bar.

3. The apparatus of claim 2 wherein said second tubular frame part has an inner wall portion of non-circular configuration slidably engaged with an outer wall portion of said first frame part of similar configuration thereby providing said connection between said first and second tubular frame parts.

4. An apparatus for tapping an opening in a vessel such as a pipe or the like while such vessel contains a fluid under a pressure differing from atmospheric which comprises, in combination, an extensible frame including first and second parts, a connection between said parts permitting longitudinal but preventing rotational movement therebetween, said first part having a tubular portion extending from an end thereof, a connector carried by said tubular portion for forming a fluid tight connection with the vessel to be tapped, a screw threaded to said first frame part for longitudinal movement with respect thereto upon turning of said screw, a boring bar extending into said frame parts and having a portion extending into said tubular portion of the first frame part, a crank arm fixed to said bar for rotating the same, speed reducing means providing a power transmitting connection between said crank arm and said screw for rotating said screw a fraction of a revolution, per each revolution of the crank arm, a force transmitting connection between said screw and boring bar preventing relative longtiudinal but permitting relative rotational movement therebetween and including an annular packing disposed within said tubular portion of said first frame part and forming a fluid tight seal between such portion and said bar, said bar and screw having opposing parts respectively abutting the ends of said packing so that longitudinal movement of the screw to advance said bar during a tapping operation applies endwise compressive force to the packing to maintain it in sealing relationship with said tubular portion and said bar.

5. The apparatus of claim 4 wherein said packing constitutes the sole connection between said screw and bar substantially effective for transmitting force from said screw to said bar to advance the latter during a tapping operation.

6. An apparatus for tapping an opening in a vessel such as a pipe or the like while such vessel contains a fluid under a pressure differing from atmospheric which comprises, in combination, an extensible frame including first and second tubular parts telescoping with each other, a connection between the frame parts permitting longitudinal but preventing rotational movement therebetween, said first frame part having an imperforate end portion extending beyond said second frame part, a connector carried by said extending end portion for forming a fluid tight connection between said first frame part and a vessel to be tapped, a tubular screw extending into and threaded to said first frame part, a boring bar extending through said tubular screw and having an end extending outwardly beyond the end of said tubular screw nearest said connector and through a portion of said first frame part to define an annular space between said bar and said first frame part, an annular packing within said annular space providing a seal between said bar and first frame part, said bar and screw having opposing parts abutting the respective ends of said packing and providing with the packing a connection between said tubular screw and said boring bar to advance said boring bar during a tapping operation responsive to longitudinal movement of said tubular screw whereby said packing has endwise compressive force applied thereto during advancement of said boring bar to maintain the packing in sealing engagement with said boring bar and first frame part, and actuating means for concomitantly rotating said bar and said screw.

7. In an apparatus for tapping an opening in a vessel such as a pipe or the like while the vessel contains a fluid under pressure differing from atmospheric wherein means are provided for rotating a boring bar at a predetermined speed and a feed screw at a lesser speed, the improvement which comprises in combination therewith of a tubular housing part, a connector on said housing part for providing a fluid tight connection between the housing part and a vessel to be tapped, said boring bar extending through said housing part to provide an annular space between itself and said housing part, packing disposed in said space in sealing engagement with said boring bar and said housing part, and opposing parts carried by said boring bar and said screw in abutment with the respective ends of said packing whereby upon advancement of the boring bar by the screw, said packing is maintained in sealing engagement with said boring bar and said housing part to prevent escape of fluid from the vessel being tapped.

References Cited in the file of this patent

UNITED STATES PATENTS

| | | |
|---|---|---|
| 821,473 | Dikeman | May 22, 1906 |
| 1,321,393 | Roseberry | Nov. 11, 1919 |

FOREIGN PATENTS

| | | |
|---|---|---|
| 440,148 | Great Britain | Dec. 20, 1935 |